United States Patent [19]
Wells et al.

[11] 3,875,620
[45] Apr. 8, 1975

[54] TIE

[76] Inventors: Robert E. Wells, Box 525, Fresno, Calif. 93650; Norman L. Oliver, 5729 Siverly Ln., Fresno, Calif. 93727

[22] Filed: June 21, 1974

[21] Appl. No.: 481,700

[52] U.S. Cl. .................... 24/16 PB; 47/47
[51] Int. Cl. .............. B65d 63/00; A01g 17/06
[58] Field of Search .......... 47/44, 46, 47; 24/163 A, 24/206 A, 739 B, 17 AP, 30.5 P, 16 PB; 248/74 PB

[56] References Cited
UNITED STATES PATENTS

| 3,261,066 | 7/1966 | Chamberlin | 24/16 R |
| 3,438,095 | 4/1969 | Evans | 24/16 PB |
| 3,516,631 | 6/1970 | Santucci | 248/74 PB |
| 3,766,608 | 10/1973 | Fay | 24/16 PB |

FOREIGN PATENTS OR APPLICATIONS

| 1,080,617 | 6/1954 | France | 24/16 PB |
| 1,212,605 | 10/1959 | France | 24/16 PB |
| 1,287,485 | 2/1962 | France | 47/47 |
| 536,496 | 10/1931 | Germany | 47/47 |
| 14,910 | 6/1907 | United Kingdom | 47/44 |

*Primary Examiner*—Donald A. Griffin
*Attorney, Agent, or Firm*—Huebner & Worrel

[57] ABSTRACT

An automatically expansible tie, adapted to provide an adjustable means for securing trunks, branches, canes and the like of vines and other plants to stakes, trellises and other supports to facilitate efficient shaping, pruning and picking. As a cane or other portion of a plant secured by the tie grows, the tie is subjected to a tensile force which ruptures weakened elements of the tie and allows automatic expansion to accommodate the growth, thus avoiding the necessity of retying and the danger of girdling. The tie provides an elongated flexible strap consisting of individually expansible links constrained by filamentary bridges with weakened portions adapted to rupture when the applied tensile force reaches a predetermined magnitude, thereby allowing the corresponding link resistively to elongate.

18 Claims, 12 Drawing Figures

3,875,620

TIE

BACKGROUND OF THE INVENTION

The present invention relates to a tie and more particularly to such a tie which has an elongated strap adapted resistively to elongate when subjected to tension in excess of a predetermined magnitude and filaments extended along the strap adapted to resist elongation of the strap but to rupture when excessively stressed to permit the strap resistively to elongate.

This invention has immediate application in those agricultural endeavors which involve the raising of vines, bushes, and trees for which some device is needed to secure a growing member to an artificial support, such as stakes, wires, and trellises.

In the growth of grapevines and many other plants it is customary to support the trunks on vertical stakes driven into the ground and after the trunks have grown to a predetermined height to train canes of the vines horizontally along a trellis, wire, or other supporting member to facilitate picking and/or pruning. Some canes can be wrapped around the trellis but this is time consuming and not as dependable as desired. In most instances ties are necessary to secure the growing vine to the stake, trellis or wire. The conventional means for so doing include twine wrapped and knotted around the trunk or cane and the artificial support. Another device in use is made of paper enclosing a wire which can be twisted after closure.

The limitations of the presently existing ties to secure growing members are many and long recognized. As the secured member enlarges as it grows, the tie tends to resist the growth. A tie of flimsy construction eventually breaks and releases the growing member from its artificial support, while the more customary and stronger tie remains intact but in time girdles the growing member. Most present ties therefore require later stages of removal and/or retying, with the attendant added labor costs but the hazard of girdling nevertheless persists if the labor involved is poorly trained or otherwise deficient. The lack of availability of a vine tie with an integral automatically expansible feature has thus resulted in higher labor costs while not completely removing the hazard of girdling.

As the plants are pruned it may be advantageous temporarily to remove the ties so as to gain better access to the canes. previous ties do not incorporate features for minimizing the removal and replacement time. In doing so, the present invention achieves a significant time-saving benefit.

The tie of the present invention consists of an elongated flexible strap adapted to wrap around the growing member and the artificial support, binding the two together, with an adjustable integral locking device for rapid closure of the tie over a range of circumferences. The strap is adapted resistively to elongate longitudinally as tensile force is generated by enlargement with time of the growing member within the closed tie, the capacity to elongate is an integral feature of the invention and accomplished by a plurality of individually expansible links constrained by filamentary bridges with weakened portions adapted to rupture when the tensile force reaches a predetermined magnitude, thereby allowing the corresponding link resistively to elongate automatically in response to the tensile force, thus adjusting the tie circumference to the enlargement of the growing member without loss of the mechanical integrity of the tie.

SUMMARY OF THE INVENTION

An object of the present invention is therefore to provide a tie for growing members, such as vine trunks and canes, adapted to expand automatically as the member grows, avoiding the necessity of retying and the danger of girdling.

Another object is to provide a tie which stretches automatically upon application of a predetermined level of tension, but not below that level.

Another object is to provide a tie which is quickly and easily installed and dependable in securing such growing members.

Another object is to provide a tie for vines and the like which is economical to manufacture.

Another object is to provide a tie which is light enough to be carried in large quantities.

Another object is to provide a tie which is adjustable over a range of circumferences.

Another object is to provide a tie with a locking device which is reliable and simple, facilitating rapid installation and removal.

Another object is to provide a tie which does not deteriorate after sustained exposure to the elements.

Another object is to provide a tie with wide applicatiton for bushes, trees, vines, and other uses.

Another object is to provide a tire which is adapted to provide continuum continuun of widths, lengths, and strengths.

Another object is to provide a tie for vine canes which is conducive to efficient pruning and picking by quick disengagement of the tie when desired.

Further objects and advantages will become apparent in the subject description in the specification.

3

Figure 11:
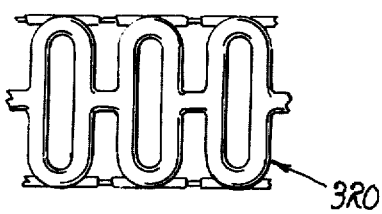

FIG. 11 is a plan view of a segment of a fourth form of the present invention showing a section of the strap employing oval type links and two rows of filamentary bridges with weakened portions.

Figure 12:
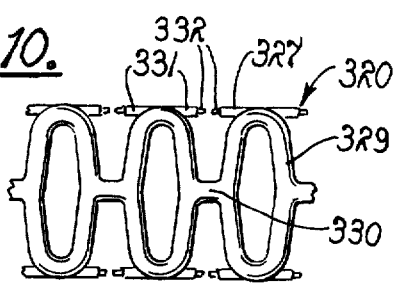

FIG. 12 is a view similar to FIG. 11 of the strap segment but with the bridges now ruptured and the oval type links partially elongated.

DESCRIPTION OF THE FIRST EMBODIMENT

Referring more particularly to the drawing, in FIGS. 1 through 6, a tie embodying the first form of the present invention is shown at 20. A characteristic operational environment for the tie is fragmentarily illustrated in FIG. 1 consisting of a vine 21 having a trunk 22. A cane 23 is shown emanating from the trunk and secured horizontally by the tie to a trellis 24. The trunk is maintained vertically by a stake 25. The first form of the present invention is better visualized in its functional position shown in FIG. 2 looped about a cane and trellis. A slot lock 26 releasably maintains the tie in a looped configuration about the cane and trellis.

Figure 3:
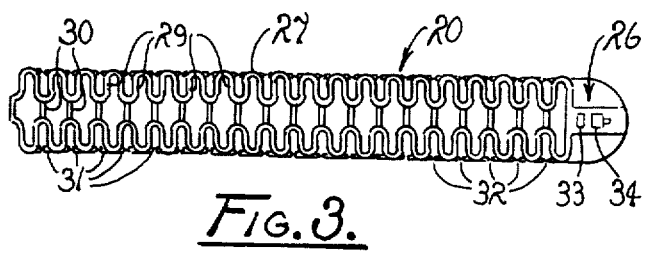
FIG. 3 is a plan view of the first form of the invention as it appears prior to use.
Figure 4:
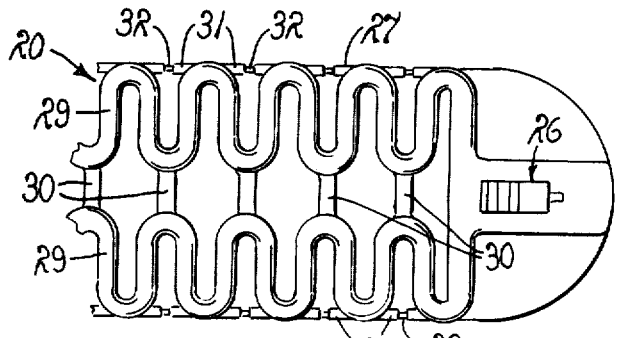
FIG. 4 is a somewhat enlarged fragmentary plan view of an end portion of the tie of FIG. 3.
Figure 6:
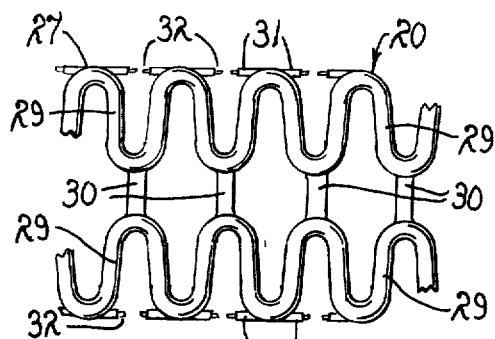
FIG. 6 is a plan view of the portion of the strap shown in FIG. 4 but showing rupture of filamentary bridges and partial elongation of links shown prior to rupture and elongation in FIG. 4.

The first form of the tie 20 is shown in its entirety in FIG. 3, including a flexible elongated strap 27 having opposite end portions to which more detailed reference will be made in connection with a discussion of the slot lock 26. The strap consists of a plurality of expansible U-shaped links or stays 29 disposed transversely of the strap and interconnected serially to form two parallel rows of links, as best shown in FIGS. 3, 4 and 6. In the first form of the present invention each link is connected to its corresponding link in the opposite row by a filament 30 extended transversely of the strap. It will be noted that successive links in each row are oppositely transversely disposed and further that corresponding links in the opposite rows are oppositely disposed so that the return bent portions of the links are disposed adjacent to each other for interconnection by the filaments 30. Expressed differently, each row of links consists of a continuous, successively oppositely return bent, serpentine strand with corresponding links of the opposite rows being oppositely return bent and with the correspondingly inwardly disposed return bent portions interconnected by the filaments 30.

The strap 27 also includes filamentary bridges 31 extended longitudinally of the strap adjacent to the outer edges thereof interconnecting successive links longitudinally to the strap, as shown in FIGS. 3 through 6. Each filamentary bridge has a weakened portion 32, visible in FIG. 4 as an interval of reduced diameter of the bridge.

FIG. 6 shows the filamentary bridges 31 after rupture of the weakened portions 32. The partial expansion of the U links 29 is also shown in FIG. 6.

Figure 5:
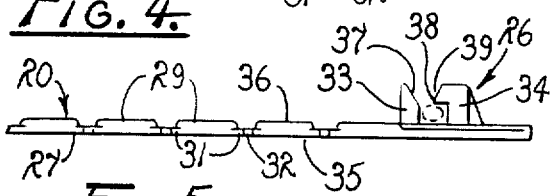
FIG. 5 is a side elevation of the portion of the first form of the invention shown in FIG. 4 showing a first form of locking device.

The first form of the tie 20 has the slot type lock 26, shown in detail in FIGS. 4 and 5, consisting of a stud 33 and a clamp 34 in adjacent spaced relation adapted frictionally to accept any one of the filaments 30. The strap has a predetermined inner surface 35 and outer surface 36. The stud and clamp are outwardly extended from the outer surface. The stud has an outwardly disposed beveled guiding surface 37 which extends obliquely inwardly toward the clamp. The clamp provides a hook 38 which confronts the stud and provides an outwardly disposed guiding surface 39 which inwardly converges with the guiding surface 37 of the stud to form a funnel like channel for the filaments.

4

The tie of the present invention is preferably molded from polyethylene or any other suitable thermal plastic material having limited resilience and elasticity. Thus, as a filament 30 is thrust between the guiding surfaces 37 and 39, the stud 33 and clamp 34 are thrust apart sufficiently for the filament to pass the hook 38 whereupon the stud and clamp spring toward each other to capture the filament therebetween.

DESCRIPTION OF THE SECOND EMBODIMENT

Figure 7:
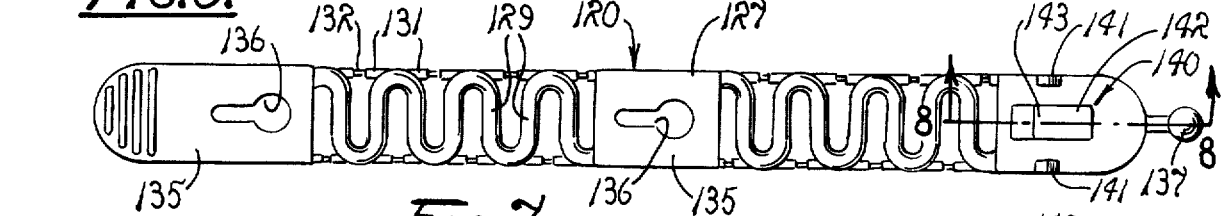
FIG. 7 is a plan view of a second form of the present invention.

A tie 120 embodying a second form of the present invention is shown in its entirety in FIG. 7. The tie consists of an elongated strap 127 having opposite end portions. The strap 127 provides a plurality of expansible U-shaped links 129 disposed transversely of the strap and serially interconnected to form a single row. As with the first form, successive links in the row are disposed oppositely transversely of the strap. Thus, the row consists of a continuous, successively oppositely return bent, serpentine strand. The strap 127 also includes two rows of filamentary bridges 131 having weakened portions 132 which are substantially the same as bridges 31 and weakened portions 32 of tie 20. The filamentary bridges extend longitudinally of the strap and interconnect the adjacent return bent portions of the links at opposite sides of the strap.

For alternate use, the strap 127 also provides a slot type lock 140. It consists of a stud 141 outwardly extended from the strap and a clamp 142 in adjacent spaced relation thereto. The clamp provides a hook 143 in outwardly spaced relation to the stud. The stud and hook preferably provide respective convergent guide surfaces 144 and 145. To secure the strap in circular configuration, the hook 143 is hooked over a transverse portion of a selected link 129 and such portion forced between the surfaces 144 and 145 until the portion is dependably lodged between the clamp and stud.

Figure 8:
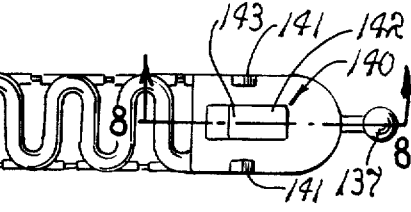
FIG. 8 is a somewhat enlarged section taken on line 8—8 of FIG. 7.

The strap 127 has spaced throughout at regular intervals a plurality of plates 135, shown in FIG. 7. Each plate includes a keyhole slot 136. A spherical key 137, shown in FIGS. 7 and 8 is provided on an end of the strap and can be selectively lodged in the keyhole slots to secure the tie about a trunk, branch or cane of a growing plant.

DESCRIPTION OF THE THIRD EMBODIMENT

Figure 9:
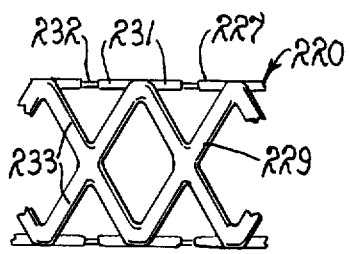
FIG. 9 is a plan view of a segment of a third form of the present invention showing the strap employing X-type links and two rows of filamentary bridges with weakened portions.
Figure 10:
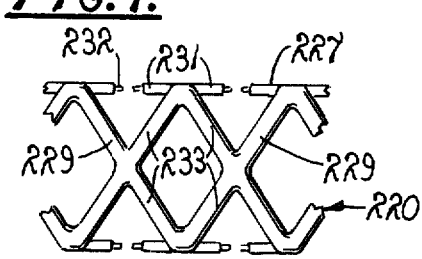
FIG. 10 is a similar plan view of the strap section of FIG. 9 but with the bridges now ruptured and the X-type links partially elongated.

A third form of the present invention is shown fragmentarily at 220 in FIGS. 9 and 10. It consists of a strap 227 having a plurality of X-shaped links 129 and two rows of filamentary bridges 231 having weakened portions 232. The bridges are identical to the bridges 31 of tie 20. The X links are individually expansible, disposed transversely of the strap and interconnected serially to form a row. Each link consists of a pair of crossed legs 233 extended oppositely obliquely transversely of the strap. The outer ends of the legs of adjacent links are integrally interconnected. As shown, the filamentary bridges 231 extend longitudinally along opposite sides of the strap 227 and interconnect successive integrally interconnected legs. FIG. 9 shows the weakened portion 232 of the bridges intact, while FIG. 10 shows the same portions after rupture releasing the links to elongate longitudinally of the strap. The strap 227 is provided with the same type of lock as shown at 26 in the first form of the invention but which engages the crossed portions of the legs 233 in the same manner as the lock 26 engages the filament 30.

DESCRIPTION OF THE FOURTH EMBODIMENT

A fourth form of the present invention is shown fragmentarily at 320 in FIGS. 11 and 12. A portion of an elongated strap 327 is shown consisting of a plurality of oval links 329 serially interconnected in a row by integral arms 330 extended longitudinally centrally of the strap. At the sides of the straps, the adjacent links are interconnected by filamentary bridges 331 having weakened portions 332. FIGS. 10 and 11 respectively show the weakened portions before and after rupture by longitudinal tension in excess of that which the weakened portions can withstand.

OPERATION

The operation of the described embodiments of the present invention is believed to be clearly apparent and is briefly summarized at this point. The various forms of ties 20, 120, 220, and 320 are adapted to tie growing members 22 and 23 of vines and other plants to artificial supports 24 and 25, and as the growing member enlarges with time, automatically to adjust its circumference as required by the member in its enlarged state. In practice, after determining the points at which the growing member requires support, ties are positioned at those points encircling the growing member and the artificial support. The tie is then closed and locked. The initial tension imposed on or slack allowed to the tie is determined at the time of installation by which filament 30 is mated with slot lock 26.

Figure 1:
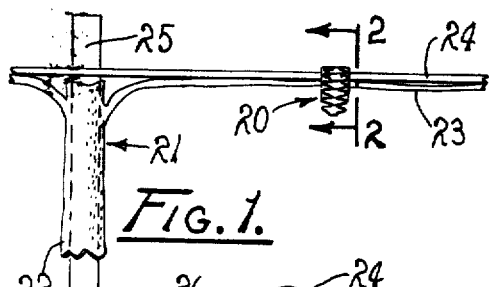
FIG. 1 is a fragmentary side elevation of a grapevine and a supporting trellis with a first form of the present invention shown in side elevation securing a cane to the trellis.
Figure 2:
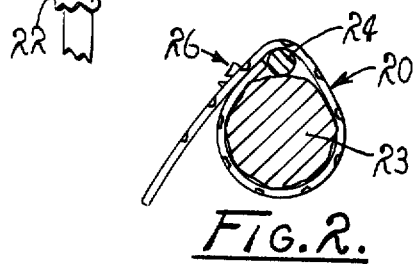
FIG. 2 is a somewhat enlarged sectional view of the tie, cane, and trellis taken on line 2—2 of FIG. 1.

In the first form of the invention, the tie 20 is tensioned about the cane 23 and the trellis 24, as shown in FIGS. 1 and 2. The lock 26 is then thrust against a selected filament 30 until the filament is dependably captured between the stud 33 and the clamp 34. So positioned, the tie holds the cane in place on the trellis. Of course, the tie may be utilized in precisely the same manner to hold the trunk 22 against the stake 25.

As the cane grows, the tie 20 is subjected to increasing tension. When the tension exceeds the ability of the weakened portions 32 to resist, such weakened portions rupture allowing their respective links to elongate but continue to hold the cane dependably in position. As growth and continued expansion continue, additional weakened portions rupture permitting further elongation of the strap as best illustrated in FIG. 6. As the bridges release their respective links 29, the portions of the links disposed transversely of the strap gradually are drawn in the direction of the stress longitudinally of the strap making possible a long range of expansion.

It will be noted that the links are not free to expand, however, until the constraining bridges attached thereto are ruptured. This threshold effect allows the tie to be formed so as not to allow expansion until a predetermined stress level is attained. Thus, the tie can be adapted to secure very light canes by e.g. use of light construction and thin bridges 31 and similarly to support heavier canes by use of a sturdier construction such as bridges calculated to rupture at a higher level of tensile stress.

In the second form of the invention, shown in FIGS. 6, 7 and 8, the strap 127 is tensioned about the cane 23 and trellis 24 or trunk 22 and stake 25, as with the first form. The strap is then secured in position either by inserting the key 137 in the slot 136 or by securing the lock 140 to any selected link 129. As the cane or trunk expands, the weakened portions 132 rupture, severing the bridges 131 and releasing their respective links to stretch and permit elongation of the strap.

Similarly, the third form of the invention shown in FIGS. 9 and 10 and the fourth form shown in FIGS. 11 and 12 permit elongation of the straps 227 and 327 by rupture of the bridges 231 and 331 to release their respective links 229 and 329 to elongate longitudinally of the ties 220 and 320.

The locking devices 33 and 34, 136 and 137, and 142 and 143 afford quick and easy installation of the ties 20, 120, 220 and 320 simply by wrapping the ties once around the articles to be secured and inserting the filaments 30 or links 129 selected into the lock 26 or 140 or by inserting the key 137 into the slot 136. Removal is equally rapid, and is accomplished by reversing the above steps. The plurality of locking filaments and links adapts the ties to a wide range of easily selected initial circumferences.

In view of the foregoing, it will be apparent that the ties 20, 120, 220 and 320 are quickly and easily installed, automatically elongate to accommodate growth without girdling when subjected to stresses in excess of predetermined levels and are quickly and easily removed. They are economical to produce, durable and fully effective in performing their intended functions.

Although the invention has been herein shown and described in what are conceived to be the most practical and preferred embodiments, it is recognized that departures may be made therefrom within the scope of the invention.

Having described our invention, what we claim as new and desire to secure by Letters Patent is:

1. A tension resisting device comprising a plurality of links interconnected along a predetermined axis of reference, said links being adapted individually to elongate along the axis when subjected to distorting tension therealong, and bridges interconnecting successive links in substantially parallel relation to the axis resistive to distortion of their respective links and adapted to rupture to release their links to distort when subjected to tension of a predetermined magnitude.

2. The device of claim 1 which is elongated along said axis and has releasable fastening means spaced therealong engageable to secure said device in looped configuration.

3. A device for resisting tension to a predetermined magnitude in a predetermined direction with substantially no distortion and when subjected to a tension greater than said magnitude in said direction resistively to elongate in the direction of said tension while maintaining continuity comprising a plurality of elongated links successively interconnected along said predetermined direction and individually extended transversely to said direction from their points of interconnection whereby when stressed beyond said predetermined magnitude said links are distorted toward alignment with said direction, and bridges substantially aligned with said direction interconnecting successive links at positions in spaced relation to their points of interconnection adapted to resist tension on the device less than said predetermined magnitude to preclude said distortion of the links but to rupture when the device is subjected to tension greater than said magnitude to release their respective links for said distortion.

4. The device of claim 3 in which the links and bridges are unitary.

5. The device of claim 3 in which the bridges are elongated filaments having weakened points of rupture.

6. The device of claim 3 in which the links and bridges are of unitary plastic construction and the bridges are elongated filaments having weakened points of rupture.

7. The device of claim 3 including a plurality of releasable fastening means spaced among said links engageable to secure said device in a looped configuration.

8. An automatically expanding tie comprising an elongated strap including a plurality of interconnected links expandable longitudinally of the strap, and bridges interconnecting the links in substantially fixed spatial relation longitudinally of the strap whereby said bridges are adapted to rupture by subjection to tension longitudinally of the strap to release the links for expansion.

9. The device of claim 8 in which the links and bridges are unitary.

10. The device of claim 8 in which the bridges are elongated filaments having weakened points of rupture.

11. The device of claim 8 in which the bridges and links are of unitary plastic construction and the bridges are elongated filaments having weakened points of rupture.

12. The tie of claim 8 having a plurality of releasable fastening means spaced therealong engageable to secure said tie in a looped configuration.

13. An automatically expansible tie comprising interconnected links and bridges, the links being resistively expansible are serially interconnected, said bridges being individual to the links, integral with their respective links, and serially interconnected along the links, said bridges having points of weakened resistance adjacent to their respective links.

14. The tie of claim 13 in which the bridges and links are of unitary plastic construction.

15. The tie of claim 13 wherein the links and bridges form an elongated strap which has a plurality of keyhole slots spaced therealong and a key mounted on one end of the strap releasably engageable in the keyholes to secure said tie in a looped configuration.

16. The tie of claim 13 wherein the links and bridges form an elongated strap which has a plurality of filamentary tongues spaced therealong and disposed transversely of the strap, and a slot provided in one end of the strap engageable with a selected tongue to secure said tie in a looped configuration.

17. The tie of claim 13 wherein the links and bridges form an elongated strap which has a plurality of filaments spaced therealong disposed transversely thereto, and there being a slot in one end of the strap releasably frictionally engageable with a selected filament to secure said tie in a looped configuration.

18. A tie comprising an elongated strap including a multiplicity of elongated successively interconnected stays, alternate stays along the strap being oppositely extended transversely of the strap with successively adjacent stays having spaced end portions disposed at opposite sides of the strap, said end portions being separable upon application of tension to the strap; and filaments interconnecting said end portions resistive to separation thereof adapted to rupture upon application of tension thereon in excess of a predetermined magnitude.

* * * * *